(12) United States Patent
Valdez (10) Patent No.: US 11,882,813 B2
(45) Date of Patent: Jan. 30, 2024

(54) WILDLIFE TRACKING SYSTEM

(71) Applicant: Ronnie A Valdez, Denver, CO (US)

(72) Inventor: Ronnie A Valdez, Denver, CO (US)

( * ) Notice: Subject to any disclaimer, the term of this patent is extended or adjusted under 35 U.S.C. 154(b) by 243 days.

(21) Appl. No.: 17/484,589

(22) Filed: Sep. 24, 2021

(65) Prior Publication Data
US 2022/0117201 A1 Apr. 21, 2022

Related U.S. Application Data (60) Provisional application No. 63/092,154, filed on Oct. 15, 2020.

(51) Int. Cl.
| | | |
|---|---|---|
| *A01K 29/00* | (2006.01) | |
| *A61D 7/04* | (2006.01) | |
| *G05D 1/00* | (2006.01) | |
| *B64C 39/02* | (2023.01) | |
| *H04W 4/40* | (2018.01) | |
| *B64U 101/30* | (2023.01) | |

(52) U.S. Cl.
CPC ............... *A01K 29/005* (2013.01); *A61D 7/04* (2013.01); *B64C 39/024* (2013.01); *G05D 1/0038* (2013.01); *G05D 1/0044* (2013.01); *H04W 4/40* (2018.02); *B64U 2101/30* (2023.01); *B64U 2201/20* (2023.01)

(58) Field of Classification Search
CPC ......... A01K 29/005; A01K 5/02; H04W 4/40; A61D 7/04; B64C 39/024; G05D 1/0038; G05D 1/0044; B64U 2201/20; B64U 2101/30; A63B 24/0062; A01M 31/002; F21V 33/008
See application file for complete search history.

(56) References Cited

U.S. PATENT DOCUMENTS

| | | |
|---|---|---|
| 3,657,826 A | 4/1972 | Marshall et al. |
| 3,748,751 A | 7/1973 | Breglia et al. |
| 4,015,258 A | 3/1977 | Smith et al. |
| 4,640,514 A | 2/1987 | Myllyla et al. |
| 4,989,024 A | 1/1991 | Myers |
| 5,020,262 A | 6/1991 | Pena |
| 5,591,032 A | 1/1997 | Powell et al. |
| 5,641,288 A | 6/1997 | Zaenglein |
| 5,771,623 A | 6/1998 | Pernstich et al. |
| 6,000,163 A | 12/1999 | Gordon |
| 6,363,223 B1 | 3/2002 | Gordon |
| 6,450,816 B1 | 9/2002 | Gerber |
| 6,575,753 B2 | 6/2003 | Rosa et al. |

(Continued)

OTHER PUBLICATIONS

Coxworth, Ben, "Camera Gun Would Let "Harmless Hunters" Get Killer Wildlife Shots", http://newatlas.com/kill-shot-camera-hunting-rifle/21802, 5 pages, Mar. 12, 2012.

*Primary Examiner* — Orlando Bousono (57) ABSTRACT

The present disclosure relates to a system for tracking wildlife such as game animals. The tracking system includes a drone that has a camera and a dart dispenser that dispenses a dart with a location transmitter. The drone sends images from the camera to a remote controller, where a user pilots the drone and observes animals for disease or other behaviors, and sends instructions to dispense the dart. The real-time location of the dart is then provided to a mobile application for use in tracking or hunting the animal.

20 Claims, 5 Drawing Sheets

(56) References Cited

U.S. PATENT DOCUMENTS

| | | |
|---|---|---|
| 6,863,532 B1 | 3/2005 | Ambrosoli |
| 7,329,127 B2 | 2/2008 | Kendir et al. |
| 7,677,893 B2 | 3/2010 | Lvovskiy |
| 8,469,824 B1 | 6/2013 | Farley et al. |
| 8,613,619 B1 | 12/2013 | Couet et al. |
| 8,777,226 B1 | 7/2014 | Decker, Jr. |
| 9,526,239 B2 | 12/2016 | Valdez |
| 9,605,927 B2 | 3/2017 | Otte et al. |
| 9,694,290 B2 | 7/2017 | Valdez |
| 9,979,463 B1 * | 5/2018 | Shafer ................. G05D 1/0044 |
| 10,508,882 B2 | 12/2019 | Valdez |
| 11,134,221 B1 * | 9/2021 | Brown ...................... G01S 5/16 |
| 2002/0002788 A1 | 1/2002 | Hope |
| 2002/0009694 A1 | 1/2002 | Rosa |
| 2002/0051953 A1 | 5/2002 | Clark et al. |
| 2002/0071050 A1 | 6/2002 | Holmberg |
| 2003/0022135 A1 | 1/2003 | Shechter et al. |
| 2003/0101604 A1 | 6/2003 | McGivern |
| 2004/0031184 A1 | 2/2004 | Hope |
| 2004/0231220 A1 | 11/2004 | McCormick |
| 2005/0153262 A1 | 7/2005 | Kendir |
| 2005/0212912 A1 * | 9/2005 | Huster .................. H04N 7/188 348/143 |
| 2005/0219690 A1 | 10/2005 | Lin et al. |
| 2005/0246910 A1 | 11/2005 | Mowers |
| 2006/0043259 A1 | 3/2006 | Thompson |
| 2006/0201046 A1 | 9/2006 | Gordon |
| 2006/0265929 A1 | 11/2006 | Haney |
| 2007/0190495 A1 | 8/2007 | Kendir et al. |
| 2008/0107414 A1 | 5/2008 | Showalter |
| 2008/0233543 A1 | 9/2008 | Guissin |
| 2009/0045579 A1 | 2/2009 | Broadley |
| 2009/0111073 A1 | 4/2009 | Stanley |
| 2009/0205239 A1 | 8/2009 | Smith, III |
| 2010/0093436 A1 | 4/2010 | Lander |
| 2010/0173686 A1 | 7/2010 | Grant et al. |
| 2011/0275435 A1 | 11/2011 | Torre et al. |
| 2012/0050714 A1 | 3/2012 | McConville et al. |
| 2012/0148989 A1 | 6/2012 | Lvovskiy et al. |
| 2012/0251982 A1 | 10/2012 | Hester et al. |
| 2012/0262484 A1 | 10/2012 | Gottfeld et al. |
| 2017/0079260 A1 * | 3/2017 | Hays ........................ F41G 1/38 |
| 2017/0099829 A1 * | 4/2017 | Hays ........................ H04W 4/80 |
| 2017/0311574 A1 * | 11/2017 | Swan ..................... G06V 40/10 |
| 2019/0387735 A1 * | 12/2019 | Wynn .................. A01K 5/0291 |
| 2021/0007327 A1 * | 1/2021 | Weyer .................. A01K 11/006 |
| 2022/0371454 A1 * | 11/2022 | Fisher .................... B64F 1/222 |

\* cited by examiner

WILDLIFE TRACKING SYSTEM

CROSS-REFERENCE TO RELATED APPLICATIONS

The present application claims priority to and the benefit of U.S. Provisional Application No. 63/092,154, entitled "WILDLIFE TRACKING SYSTEM" and filed Oct. 15, 2020, the specification of which is hereby incorporated by reference in its entirety for all purposes.

BACKGROUND

The present disclosure relates to a system for tracking wildlife such as game animals including deer, elk, antelope, and others. Game hunting is a popular recreational pastime in the United States and many other countries worldwide. However, hunting regulations have become increasingly strict, limiting the duration and scope of hunting activities to particular animals, geographic areas, and other limits. In addition, some hunters prefer to participate in outdoor activities without killing or injuring healthy animals. The remainder of this disclosure is directed at systems and methods for a wildlife tracking system that enables observing, tracking, and hunting of identified animals.

SUMMARY

The present disclosure relates to a system for tracking wildlife such as game animals. In an embodiment, a wildlife tracking system includes a drone with a camera, a wireless transceiver, and a dart dispenser. The dart dispenser has a dart with an on-board transmitter. The system also includes a controller having a display screen presenting images from the drone camera, and a user input receiving instructions to navigate the drone and dispense the dart from the dart dispenser. The system also includes a mobile application displaying a graphical location marker indicating a real-time location of the dart.

In an embodiment, a method for observing and tracking wildlife includes displaying, at a remote controller, an image from a camera on a drone. The image shows an animal in a field of view of the camera. The method includes receiving, at the remote controller, a user input to dispense a dart from the drone, and displaying, on a mobile application, a graphical location marker indicating a real-time location of the dart overlaid on a map.

DETAILED DESCRIPTION

The present disclosure relates to a system for tracking wildlife such as game animals. In an embodiment, the system includes a drone piloted remotely by a user using a remote transmitter. The drone includes one or more cameras that capture images that are sent to the remote transmitter and displayed to the user on a display screen. The user pilots the drone to an area occupied by wildlife, such as game animals that the user desires to evaluate, identify, or track. The user can observe the animals (via the images sent from the drone) and decide if an individual animal should be tagged for further analysis, tracking, or removal from the area. To tag an animal, the user activates a dart dispenser carried by the drone. The drone dispenses the dart, which includes an on-board battery and transmitter. When the dart is lodged into an animal, the real-time location of the individual animal can be tracked, via the transmitter on the dart. This tracking information can be used to monitor the animal's location. In an embodiment, an animal with chronic wasting disease is identified by the user, the animal is tagged with a dart, and the real-time location information from the dart is provided through a mobile application to a hunter. The hunter can then track and hunt the particular identified animal, without harming any healthy animals. The hunter can participate in recreational outdoor hunting, and at the same time perform a community service by removing the diseased animal from the region.

Figure 1:
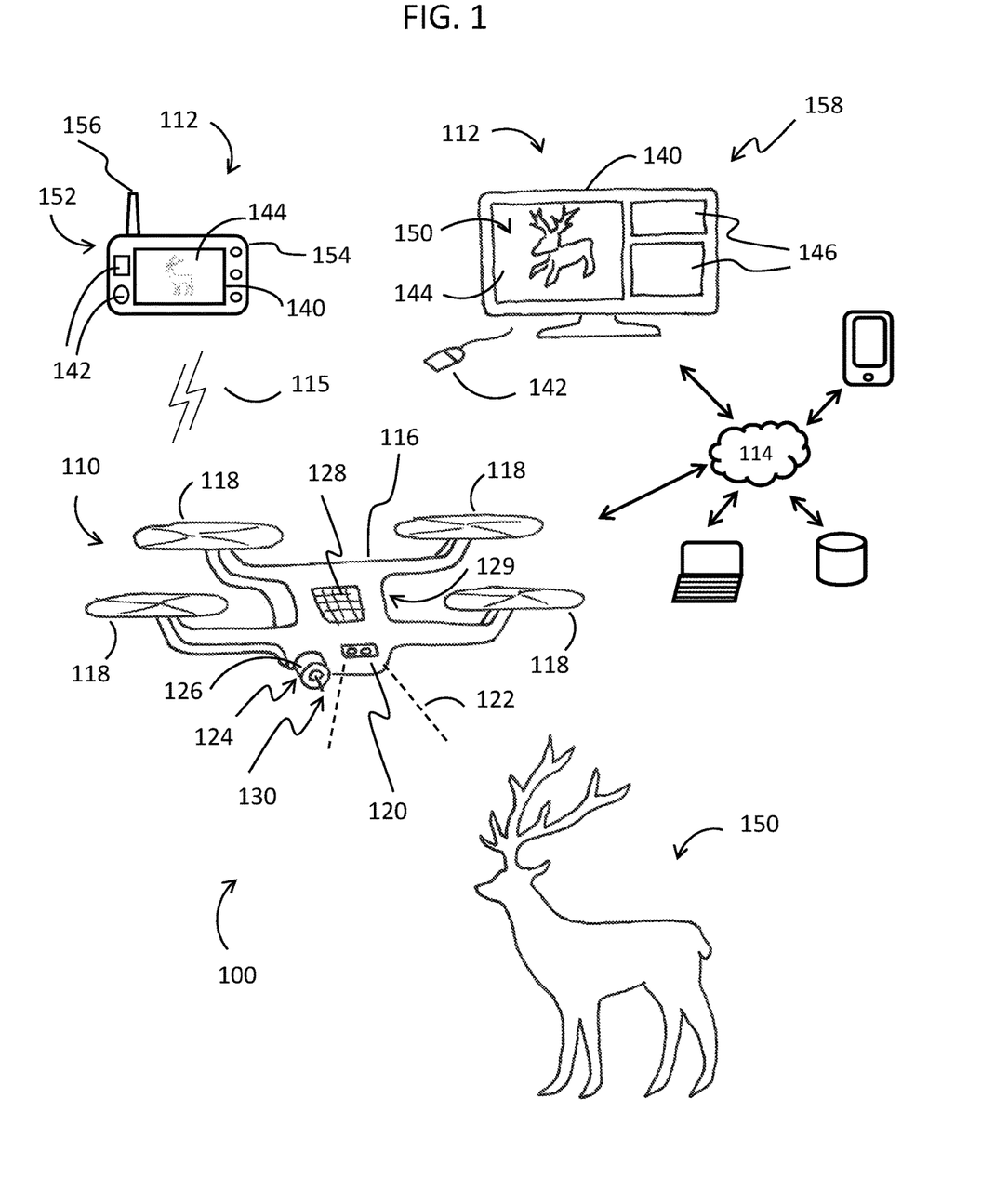
FIG. 1 is a schematic view of a system for tracking wildlife, including a controller and a drone, according to an embodiment of the present invention.

A wildlife tracking system 100 is depicted in FIG. 1. In the embodiment shown, the system 100 includes a drone 110 and a remote transmitter 112 that communicate wirelessly with each other, such as through radio communication 115 or through a remote data connection such as a cloud network 114. The drone 110 includes a body 116 that is lifted by four rotors 118. In other embodiments, different types of drones can be used, with different sizes, shapes, rotors, and flight systems. The drone can be piloted remotely by a user or can be programmed to fly autonomously. The drone can fly and can hover in place, suspended in the air, to make observations of an area.

The drone 110 includes an imaging system with at least one camera 120. The camera takes images of its field of view 122 and sends those images wirelessly to the remote transmitter 112. In an embodiment, the camera 120 includes dual cameras that provide a stereo view that can be combined into a three-dimensional image. The camera 120 takes images in visible light to provide a human-visible image. Optionally, the drone 110 also includes other types of equipment (flashlight, running lights), cameras (such as an infrared camera, temperature- or heat-sensing camera such as a thermal imager, night-vision camera, depth-sensing camera, or others), microphones, and/or speakers. The drone 110 may also include various types of environmental sensors, such as sensors that detect and measure ambient conditions (weather, humidity, wind, or others), operating conditions (battery level, running time), and other relevant parameters (date, time, location).

In an embodiment, the drone 110 includes one or more solar panels 128 on a surface of the drone (such as the top surface, facing the sun). The solar panels 128 convert sunlight into electricity and are connected to the power systems on board the drone (such as a rechargeable on-board battery) to charge, re-charge, or power the electrical components on the drone. Additionally, the drone 110 may include markings, materials, or coverings on an opposite bottom surface 129 of the drone (facing the ground) that imitate a bird or other animal, such as feathers, fur, netting, or fabric. These markings are intended to disguise the drone, so that it can approach deer or other wildlife more closely without alerting them to the presence of the drone. In an embodiment, the drone includes a speaker (see speaker 368 in FIG. 3) that emits a bird call or other animal or environmental sounds, to further disguise the drone. In an embodiment, the drone is disguised as a black crow, with the bottom surface 129 formed in the shape of crow wings spread out and covered in black feathers, and the speaker 368 emits the sound of a crow's call, such as a series of caws. This birdsong helps to muffle or drown out the more mechanical sound of the flying drone. The visual and auditory disguise of the drone 110 as a bird (or other animal) can calm the wildlife that the drone is tracking, so that the wildlife remains in the area instead of attempting to run away or hide. This calmer reaction enables the drone to approach closely and obtain a steady photograph without additionally draining the battery in an effort to chase or follow the wildlife.

The drone 110 also includes a dart dispenser 124. In the embodiment shown in FIG. 1, the dart dispenser 124 includes a barrel 126 that faces forward along the camera's field of view 122. The dart dispenser 124 dispenses individual darts 130 out of the barrel 126. The dart dispenser 124 is powered pneumatically (such as by a compressed air canister), electrically, or mechanically (such as by a spring), or with any suitable system to release darts 130 from the barrel 126 at high forward velocity. In an embodiment, the dart dispenser includes a lightweight compressed carbon dioxide ($CO_2$) cartridge, which has a volume of compressed gas sufficient to dispense 10-30 darts per cartridge. Depending on the type of drone, dart, and canister, the dart dispenser 124 can deliver darts at a velocity sufficient to pierce the skin of an animal that is 3-60 feet away.

In an embodiment, the dart dispenser 124 is positioned proximate to the camera 120, so that the barrel 126 is aligned closely with the camera's field of view 122. In an embodiment, the barrel 126 can be actively steered (such as up, down, right, left) by the user to adjust the aim of the dart 130 exiting the dart dispenser 124, in order for the user to aim the dart toward an animal in the camera's field of view.

Still referring to FIG. 1, the drone communicates with the remote transmitter 112 on which a user can actively view the image feed from the camera 120, pilot the drone 110, and control the dart dispenser 124. Two different remote transmitters 112 are shown in FIG. 1, a hand-held controller 152 on the left and a computer 158 on the right. In an embodiment, the transmitter 112 is a hand-held controller 152 with a housing 154 that includes a display screen 140 and user input 142 (such as hard keys or buttons, soft keys, touch screens, joysticks, dials, switches or other interfaces). The display screen 140 shows an image 144 from the camera(s) 120 on board the drone 110, such as a live image 144 of an animal 150 in view. The hand-held controller 152 also includes an antenna 156 which communicates wirelessly with the drone 110 such as through radio signals 115.

The tracking system 100 may also or alternatively connect to a distributed computer system such as cloud-based network 114, which can access various components of the system. These components may include additional remote screens, mobile devices (smartphones, tablets), computers (laptops, desktops), databases and storage devices, servers, computer processors, transceivers, and other computing devices. The remote transmitter 112 that is used to pilot the drone 110 may be the hand-held controller 152 on-site with the drone, or it may be a component of the distributed computer network, such as computer 158. The computer 158 also includes a display screen 140 and a user input 142 (such as a computer mouse, trackpad, keyboard, or similar equipment). The screen 140 shows an image 144 from the camera 120 on board the drone 110, and also includes other graphical windows 146 that display additional information about the drone 110, the drone's flight path, navigation controls, the animals in the field of view, or other information relevant to operation of the drone.

In FIG. 1, the image 144 is a live image feed from the camera 120, showing an animal 150, in this case a deer. The user who is viewing the display (such as on the handheld controller 152 or the computer 158) can observe the deer 150 for any desired criteria, can enter these observations (for example, in windows 146), and can utilize image processing tools (such as applications stored locally on the controller 152 or computer 158, or via the network 114) to further analyze the deer 150. In an embodiment, the deer 150 is analyzed for symptoms of chronic wasting disease (CWD), and criteria are applied to make a determination (by the user, or automatically by the software application) whether or not the deer 150 in the image 144 is a carrier of the disease. Symptoms of CWD include low weight, gaunt skin, elevated body temperature, diarrhea, staggering, red eyes, excess mucous (such as around the mouth, nose, or eyes), excess salivating, and lethargy. The deer 150 is observed to determine if the deer exhibits these symptoms, such as by matching observations (such as images or other measurements) against a set of criteria (such as numeric thresholds for weight and temperature, and quantified visible markings of mucous, diarrhea, etc.) that define a positive determination of CWD.

Figure 2:
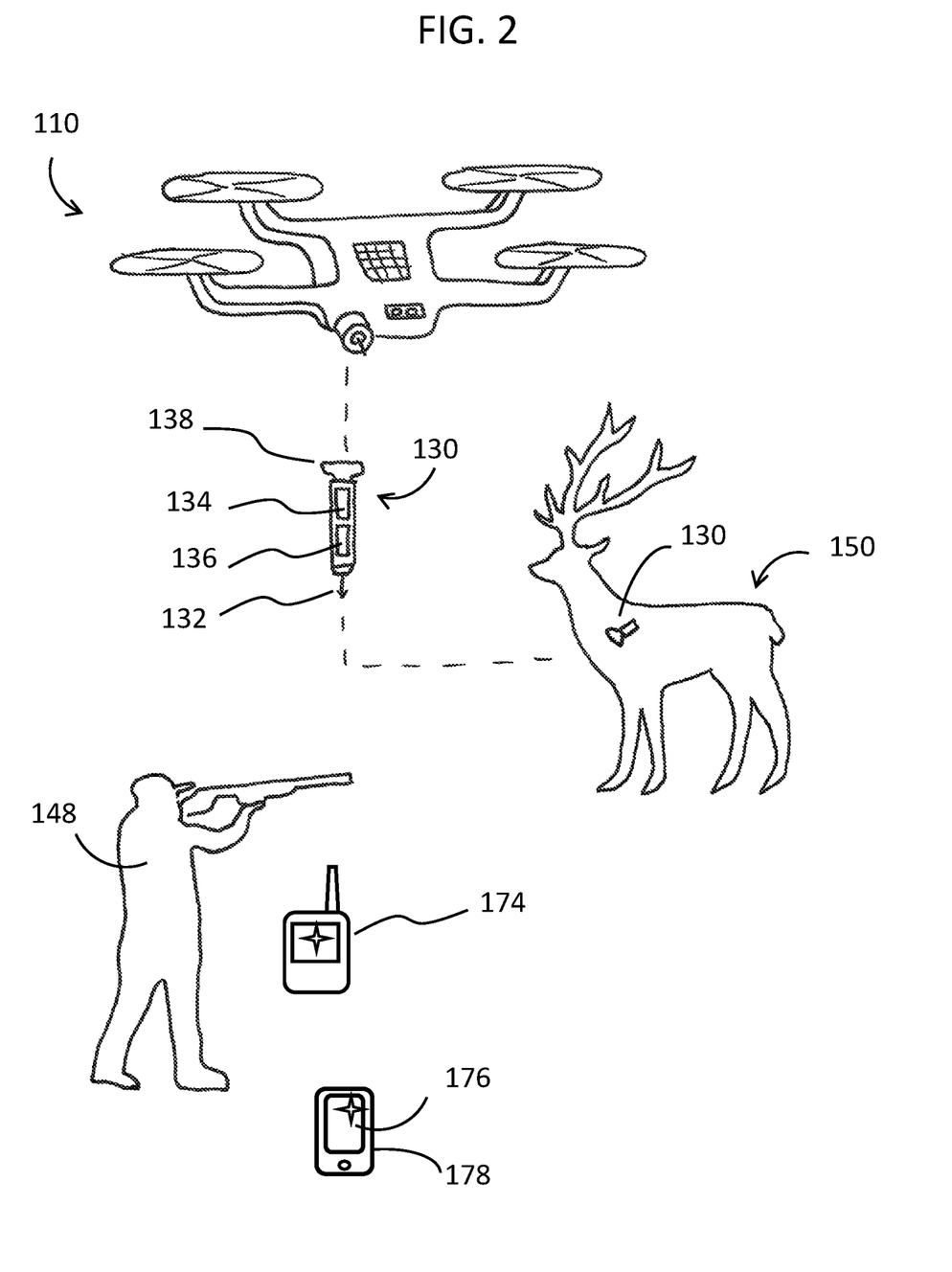
FIG. 2 is a schematic view of a drone with a dart dispenser, and a mobile tracking application, according to an embodiment of the present invention.

While a deer is shown in FIGS. 1-2, the tracking system can be used to observe, tag, track, and/or hunt various types of animals including deer, elk, antelope, moose, big horn sheep, rams, mountain goats, and others. The system can be used to identify animals with CWD or other diseases, conditions, or behaviors such as plague, rabies, high fever, and other conditions. CWD in particular is a concern, as it can spread quickly through wild animal populations, and its spread is exacerbated by shrinking forest or other habitat areas due to forest fires or other causes. Identifying and removing animals with CWD may help to slow or prevent the spread of the disease.

In an embodiment, the image 144 includes a thermal image of the field of view in front of the drone 110, to provide the user with information about the body temperature of the animal 150. If the temperature is elevated above a threshold level (such as a level indicating a fever or a high fever), the user may decide to dispense a dart toward that animal. When several animals are shown within the field of view, the thermal image may help the user quickly identify animals that are diseased, as they appear brighter (than non-diseased animals) in the image due to their higher body temperature. For example, higher temperatures may be shown by brighter or darker red color, and lower temperature by lighter red or pink colors. In an embodiment, the remote controller 112 displays a color gradient showing the temperatures of the animals in view. This color gradient can help the user identify animals to consider as targets for darts.

In an embodiment, the display screen 140 displays a list of symptoms or conditions that the user checks prior to determining whether to dispense a dart. For example, the screen 140 may include a checklist with symptoms. The checklist may be interactive, and the user checks off the symptoms that are present in the animal that the user is observing. In an embodiment, the dart dispenser is activated when the user indicates that a threshold number (such as three, four, or five) of symptoms are present in an individual animal 150. For example, if the user inputs checks to indicate that the animal 150 has two, three, four, five, or another threshold number of symptoms (such as symptoms of CWD or other disease or condition), the transmitter 112 enables the controls for the user to activate the dart dispenser. In an embodiment, the transmitter 112 includes a processor or computer (or accesses one via a distributed network) that runs a stored algorithm to evaluate the symptoms of the animal 150 in the field of view of the drone, and to automatically determine whether the animal 150 has a particular disease or condition. The transmitter can then present this determination to the user to help the user decide whether to dispense a dart. In an embodiment, this determination is displayed on the display screen 140, and the thermal image (from the thermal imager on the drone) is used to confirm that the animal 150 in view has an elevated temperature. If both the symptom threshold is reached and the animal's temperature is elevated, then the dart dispenser is activated and a dart may be dispensed.

In an embodiment, the drone 110 is programmed to hover for a duration of time with one or more animals 150 in the field of view of the camera 120. Hovering near the animals elicits reactions from the animals, and their reactions can be assessed for symptoms. For example, a healthy deer (or other animal) may respond to noise from the drone by looking at the drone, retreating, or running, while a diseased deer may fail to respond, move, or run. The drone may also be programmed to hover without causing a reaction by the animals, such as with the disguise options described above.

If the user and/or stored algorithm determine that the deer 150 has CWD, the user can control the drone 110 to dispense a dart 130 toward the deer 150. This is shown, for example, in FIG. 2. The dart 130 includes a needle 132, battery 134, transmitter 136, and tail or stabilizer 138. The needle 132 pierces the animal 150 at a shallow depth but does not otherwise injure the animal. The animal is still free to roam the region, carrying the dart 130, which acts as a tracking tag. The battery 134 powers the transmitter 136 which transmits the current location of the dart 130, for an amount of time depending on the battery capacity, such as 1 day to 30 days or longer. In an embodiment, the dart 130 remains with the animal, and the tail 138 provides a visible confirmation that the animal has been tagged. This visible tail 138 can be a bright color such as orange, yellow, red, or neon colors, which can be useful for a hunter to confirm that the animal has been tagged, prior to hunting it. In another embodiment, the dart 130 is activated to release a tracking beacon into the animal, and then the dart falls away and does not remain with the animal. In this case, the dart may include a push spring that is activated when the front point of the dart impacts a target. The impact releases the spring, which pushes a tracking beacon forward into the animal. The tracking beacon remains lodged into the animal, while the rest of the dart falls away.

As shown in FIG. 2, the dart's location is provided to a mobile device such as a GPS tracker 174 or smartphone 178 or other mobile computer. The dart location is indicated by a location marker 176. In an embodiment, this location marker 176 may be provided to a single hunter or tracker 148, so that only one person has access to the real-time location of the dart 130 and deer 150. This gives a single person the opportunity to track the deer for recreational or professional hunting. Alternatively, the location of the dart can be provided to two or more people (or up to a maximum cap of three, five, ten, or other number of people) to enable them to work together or compete to track the darted animal. In another embodiment, the location of the dart is first provided to a single person for a first time duration, to give the first person an exclusive period of time to hunt or track the animal. After that first time duration, if the animal is still active, then the dart location is provided to additional people.

Figure 3:
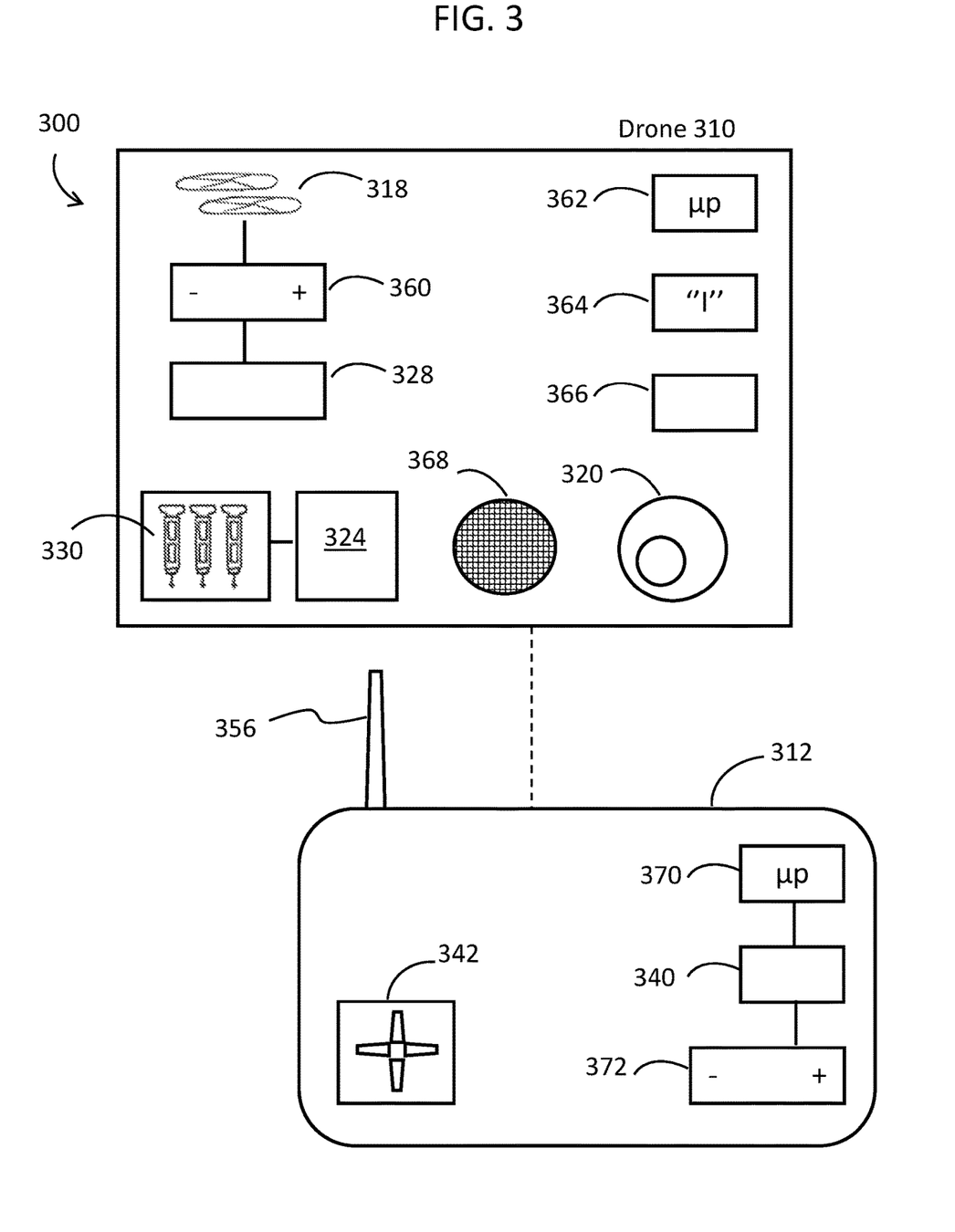
FIG. 3 is a box diagram of a drone and a remote transmitter in wireless communication, according to an embodiment of the present invention.

FIG. 3 is a box diagram of a tracking system 300 including a drone 310 and a transmitter 312, to show some of the components. The drone 310 includes one or more rotors 318, a battery 360, one or more cameras 320 (such as a visible light camera and a thermal imager), an on-board computer or processor 362, a dart dispenser 324, darts 330, a wireless transceiver or antenna 364, a location sensor or tracker 366 (such as a GPS clock), solar panels 328, and a speaker 368. The transmitter 312 includes an on-board computer or processor 370, display screen 340, user input 342, wireless transceiver or antenna 356, and battery 372. This view is not exhaustive, and other components may be included in the drone 310 and transmitter 312 as well.

Figure 4:
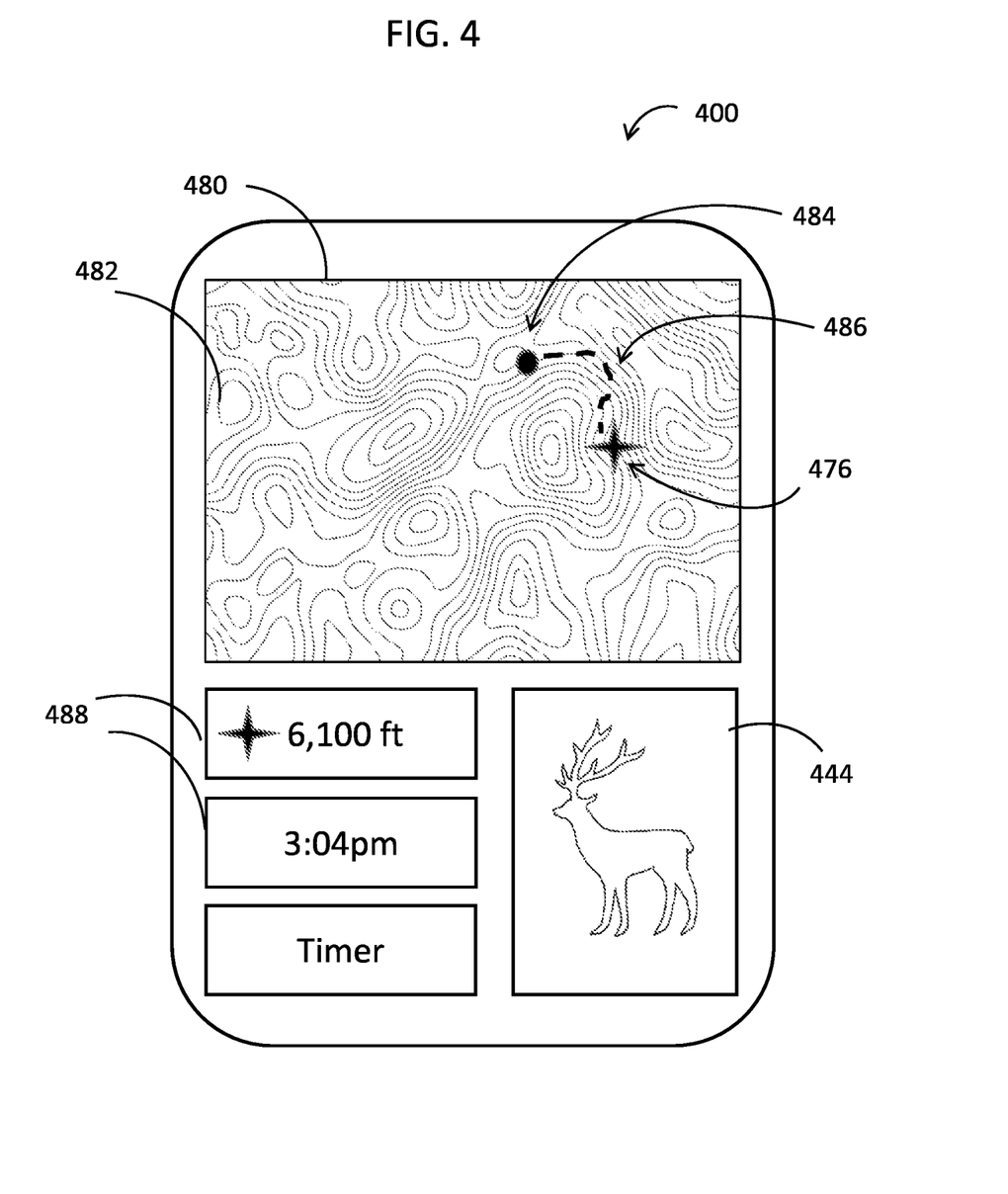
FIG. 4 is a front view of a mobile application for tracking an identified animal, according to an embodiment of the present invention.

FIG. 4 is a front view of a mobile application 400 for tracking an identified animal, according to an embodiment of the present invention. The application 400 presents a user interface with interactive graphic elements for tracking the location of the dart (such as dart 130). In the embodiment shown, the application 400 includes a map window 480 displaying a map of the vicinity of the dart, and a graphical location marker 476 which shows the current location of the dart. The map is a topographical map with topographical lines 482 that show elevation or similar terrain information. The map also displays a second graphical location marker 484 which indicates the user's location, which may be based on the user's mobile device (such as the user's smartphone 178 or tracker 174 in FIG. 2) which is displaying the application 400. The second marker 484 may have a different size, shape, or color than the first marker 476, to distinguish the two markers. Additionally, the application also shows a navigation route 486 in the form of a dashed line (or similar graphic) with instructions to navigate the user toward the location of the dart, such as along roads, paths, or hiking trails, and taking into account steep terrain or changes in elevation.

The application 400 may include other graphical or text windows 488 that show additional information such as the dart's elevation (for example, 6,100 feet), the current time (for example, 3:04 pm), and other tools such as a timer. The timer can count down how much time remains on the hunter's allocated time period for hunting the darted animal, or count down how much time remains until the location of the dart is shared with other users, or count down an estimated time remaining for the dart to continue transmitting its location before it runs out of power, or other time periods. The timer can also count up an amount of time that the user has been tracking the darted animal, or using the application 400, as examples. If the elevation of the dart is very high, for example, the user may decide that the animal is high up a hill or mountain and not accessible to be hunted at that time. In an embodiment, the application includes an image 444 which was taken by the drone when it dispensed the dart 130. This image 444 can help the user identify the correct animal when the user finds the darted animal in person.

The application 400 may present various types of maps in addition or in alternative to the topographical map, such as an aerial map, satellite image or map, street map, etc. The graphical markers 484, 476 are overlaid on top of the map. In an embodiment, several location markers 476 are displayed, showing the different locations of several different darted animals. This may be the case when several individual animals in a herd or in a region have been tagged with darts to indicate that the animals may or should be hunted.

The user can then track all of the darted animals by viewing the multiple location markers 476 on the application 400. In this case, each location marker 476 may be the same graphical marker or may be different (different color, shape, size, label, etc).

The application 400 shows the real-time location of the user (marker 484) and the one or more darted animals (marker(s) 476), updating those locations based on the transmitters in the dart(s) and the user's device and moving the markers accordingly on the map 480.

In an embodiment, the application 400 includes a user input (such as typing or clicking in one of the windows 488) through which the user indicates that a particular animal has died. The user enters this information into the application 400 so that the dart 130 associated with that animal can be deactivated, and the location of that animal is no longer displayed to other users who may be tracking or hunting darted animals. Additionally, in an embodiment, the application 400 notifies the user if a dart is deactivated by another user (such as removing the associated marker 476 from the map 480), and can also notify the user if a dart has been stationary for longer than a set duration of time (such as longer than a day), as a lack of movement of the dart may indicate that the animal has already died or that the dart has become separated from the animal. This notification may be a text notification or alert, an icon, and/or a removal of the marker 476 from the map.

Figure 5:
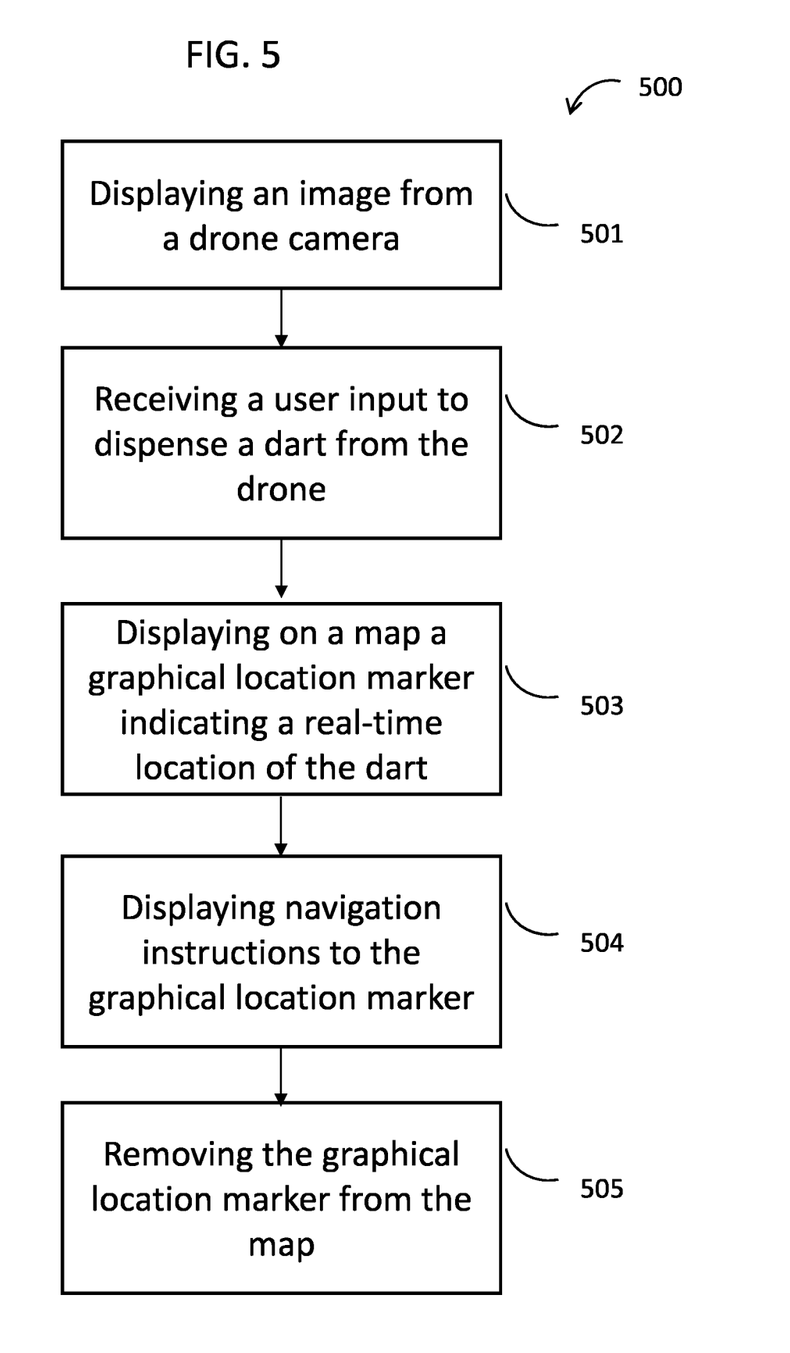
FIG. 5 is a flowchart of a method of identifying and tracking an animal, according to an embodiment of the present invention.

FIG. 5 is a flowchart of a method 500 of identifying and tracking an animal, according to an embodiment of the present invention. The method includes displaying an image from a drone camera, at 501. The image can be displayed on the display screen of a transmitter, such as the hand-held remote controller 152 or the computer 158, which can also receive the user's commands to pilot the drone. The method includes receiving a user input to dispense a dart from the drone, at 502. The user input can be received at the remote controller 152 or at the computer 158, for example, after the user determines that the animal is symptomatic of a particular disease or condition. The method also includes displaying on a map a graphical location marker indicating a real-time location of the dart, at 503, and displaying navigation instructions to the graphical location marker, at 504. These markers and instructions can be displayed on a map that is presented on a mobile application on a smartphone or GPS tracker. The method also includes removing the graphical location marker from the map, at 505, such as after a user indicates that the animal has died.

It should be noted that components in the figures are not necessarily to scale. Although exemplary embodiments have been described and illustrated, it should be understood that changes and modifications to these exemplary embodiments are also within the intended scope of this disclosure.

What is claimed is:

1. A wildlife tracking system comprising:
a drone comprising a camera, a wireless transceiver, and a dart dispenser, wherein the dart dispenser comprises a dart having a transmitter;
a controller having a display screen presenting images from the camera, and having a user input receiving instructions to dispense the dart from the dart dispenser; and
a mobile application displaying a graphical location marker indicating a real-time location of the dart.

2. The system of claim 1, wherein the mobile application comprises a map, and wherein the graphical location marker is overlaid on the map.

3. The system of claim 2, wherein the mobile application comprises a second graphical location marker indicating a real-time location of a mobile device presenting the mobile application.

4. The system of claim 3, wherein the mobile application further comprises a navigation route between the two graphical location markers.

5. The system of claim 1, wherein the dart dispenser comprises a compressed gas canister.

6. The system of claim 1, wherein the controller comprises a hand-held housing having an antenna for wireless communication with the drone.

7. The system of claim 1, wherein the drone further comprises a thermal imager, and wherein the display screen on the controller displays a thermal image of a field of view.

8. The system of claim 1, wherein the controller includes a display window presenting a checklist of disease symptoms.

9. The system of claim 8, wherein the checklist is interactive.

10. The system of claim 1, wherein the mobile application receives an input indicating that the dart is no longer associated with a living animal.

11. The system of claim 3, wherein the mobile application comprises a user input indicative of a status of an animal darted with the dart.

12. The system of claim 11, wherein the mobile application further comprises an indication that the dart has been deactivated.

13. A method for observing and tracking wildlife, comprising:
displaying, at a remote controller, an image from a camera on a drone, the image comprising an animal in a field of view of the camera;
receiving, at the remote controller, a user input to dispense a dart from the drone, wherein the dart comprises a location transmitter; and
displaying, on a mobile application, a graphical location marker indicating a real-time location of the dart overlaid on a map.

14. The method of claim 13, wherein the image comprises a thermal image.

15. The method of claim 13, further comprising displaying, at the remote controller, a determination of a disease state of the animal.

16. The method of claim 15, wherein the determination comprises a user confirmation of a presence of a threshold number of disease symptoms.

17. The method of claim 13, further comprising displaying, on the map, a second graphical location marker indicating a real-time location of a device presenting the mobile application.

18. The method of claim 17, further comprising displaying, on the map, navigation instructions from the second graphical location marker to the graphical location marker of the dart.

19. The method of claim 16, further comprising activating the dart based on the user confirmation.

20. The method of claim 13, further comprising providing the real-time location of the dart to additional users after a first time duration.

* * * * *